Nov. 27, 1928.
E. DE W. PERRY
1,693,345
MAGNETO CONSTRUCTION
Filed Feb. 10, 1926  2 Sheets-Sheet 1
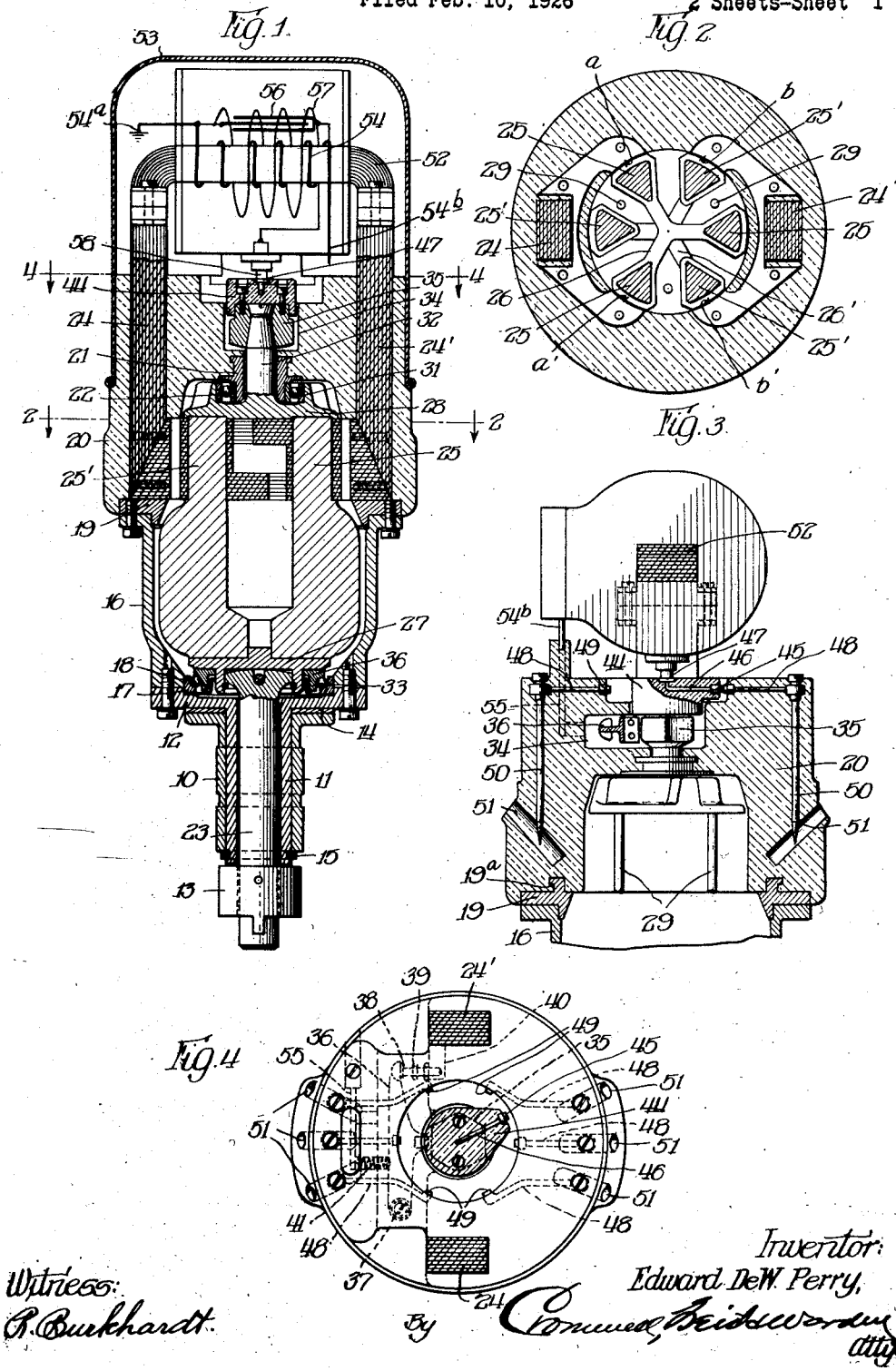
Witness:
R. Burkhardt.
Inventor:
Edward DeW. Perry,
By Commuel Beidler
attys Nov. 27, 1928. 1,693,345
E. DE W. PERRY
MAGNETO CONSTRUCTION
Filed Feb. 10, 1926 2 Sheets-Sheet 2
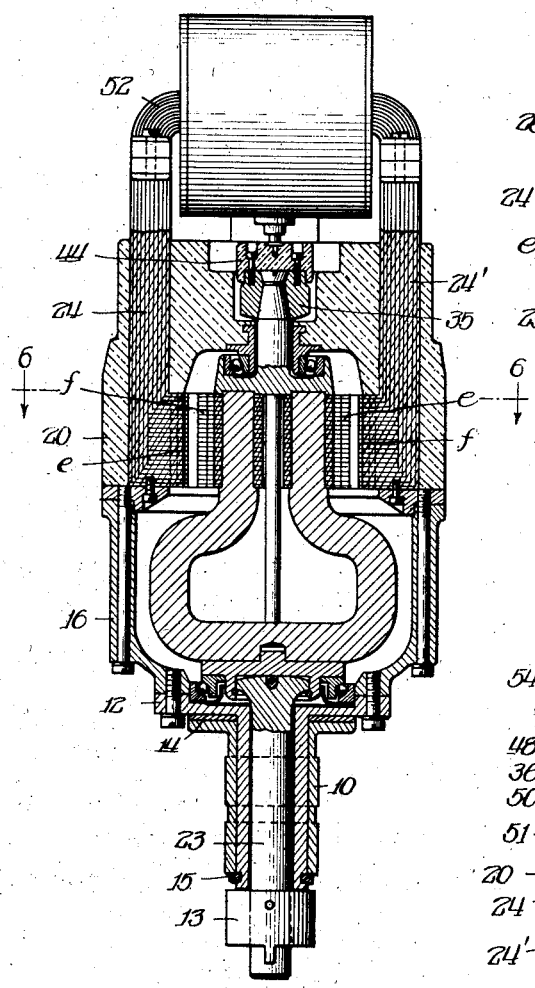
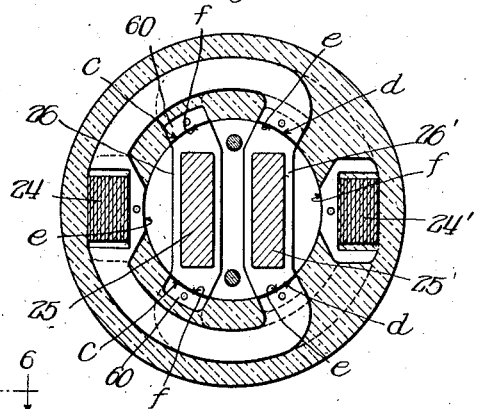
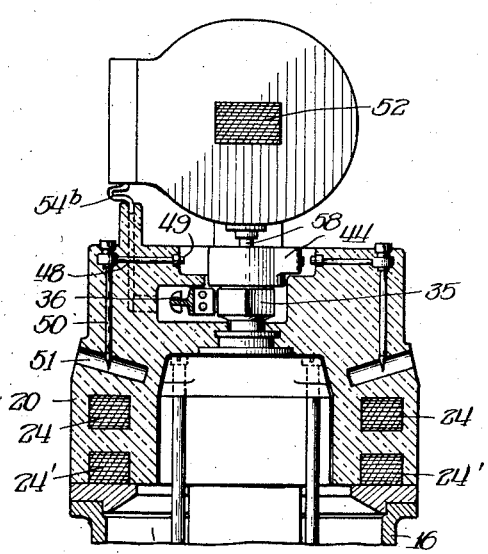
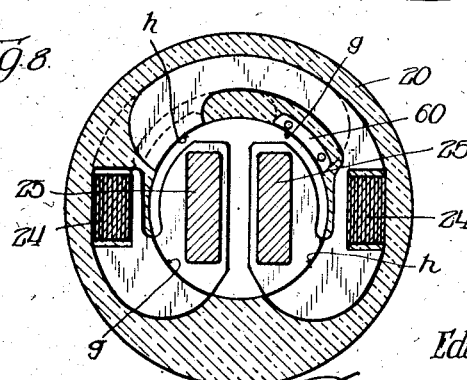
Witness:
R. Burkhardt
Inventor:
Edward DeW. Perry, Patented Nov. 27, 1928.

1,693,345

UNITED STATES PATENT OFFICE.

EDWARD DE W. PERRY, OF PAWTUCKET, RHODE ISLAND, ASSIGNOR TO SCINTILLA MAGNETO COMPANY, INC., OF SIDNEY, NEW YORK, A CORPORATION OF NEW YORK.

MAGNETO CONSTRUCTION.

Application filed February 10, 1926. Serial No. 87,242.

This invention relates to magnetos for the ignition systems of internal combustion engines, particularly for those of motor vehicles.

In the great majority of automobiles as now designed and standardized, the electrical power for ignition in the engine, as well as for other uses, such as for operation of the starting motor and the energization of lamps, is derived from a storage battery which is charged by a generator operated incident to the running of the engine. This makes the supply of energy for ignition dependent upon factors and influences which subject it to variation, and frequently results in faulty ignition, due to the inability of the electrical system to meet the diversified demands made upon it. The use of a magneto for ignition renders that important function independent of the variable factors which influence the battery system. The vast majority of present-day automobiles, however, are not equipped for the installation of a magneto, in that no place of attachment or driving means for such an instrument is provided, and frequently there is not the necessary room for the installation of a magneto constructed in some of the customary fashions heretofore employed.

The general purpose of the present invention is the provision of an improved magneto construction which does not require any special connecting or mounting arrangement, but which may be installed in the customary standard mounting employed in the ordinary battery and coil or generator system for the mounting and operation of the distributing and timing devices.

The attainment of this general object necessitates the building of a magneto which is very small and compact and of very high efficiency, and, consequently, the accomplishment of that problem constitutes another object of the invention.

Inasmuch as the employment of the magneto in conjunction with the ordinary electrical system is somewhat in the nature of an addition or adjunct to the usual equipment, the matter of cost is of particular importance, and the provision, at low cost, of a magneto having the necessary qualifications, constitutes a further object of my invention.

These objects and how they are attained, as well as other and further objects and advantages of the invention, will be pointed out hereinafter, indicated in the appended claims or obvious to one skilled in the art upon an understanding of the present disclosure.

For the purpose of this application I have elected to disclose herein certain structural embodiments of the invention, but it is to be understood that the same are presented for the purpose of illustration only, and hence are not to be accorded any interpretation which might have the effect of limiting the invention which I claim, short of its most true and comprehensive scope in the art.

In the accompanying drawings, forming a part of this specification,

Fig. 1 is a sectional elevation showing certain features of a device embodying the invention, certain elements of the armature being shown diagrammatically;

Fig. 2 is a cross section of the device such as taken approximately on line 2—2 of Fig. 1;

Fig. 3 is a part sectional elevation of the upper portion of the device taken on the diameter approximately at right angles to Fig. 1;

Fig. 4 is a cross section taken approximately on line 4—4 of Fig. 1;

Fig. 5 is a part sectional elevation of an embodiment differing in certain particulars from that illustrated in the previous figures;

Fig. 6 is a cross section as taken approximately on line 6—6 of Fig. 5;

Fig. 7 is a part sectional elevation taken on the diameter approximately at right angles to the section shown in Fig. 5; and Fig. 8 is a cross section corresponding to the section shown in Fig. 6, but of a construction differing therefrom in the arrangement of the induction elements.

The mounting for the distributing and timing device in most of the electrical systems for automobiles of present design is usually provided at the side of the engine on a portion of the generator frame or a part of the engine casing. In some instances it is above the engine. The timing and distributing device is customarily arranged in such mounting on a vertical axis and with the driving shaft arranged on the axis of the device and having driving connection with the generator shaft or the cam-shaft of the engine. The distributing and timing device customarily assume a generally cylindrical form with terminal connecting arrangements at the top for the accommodation of the wires leading to the ignition plugs. These various circumstances, which have come to be quite general practice in the design of such devices, impose upon an instrument which will attain the objects of this invention rather definite limitations as to size and form, driving connections and the like. Magnetos as heretofore designed for use in motor vehicles have been constructed, for the most part, for operation at engine speed in the case of a four cylinder engine, at one and one-half times engine speed for six cylinder engines, and at either engine speed or twice engine speed for an eight cylinder engine. While the elimination of special gearing for establishing the speed of the magneto is one of the accomplishments of the present invention, it will be appreciated that the provision of an instrument to operate at cam-shaft speed, which is one-half engine speed, involves essential improvements in generating efficiency, to the end that the coming-in speed of the instrument may be reduced substantially below that requisite for one operating at a speed double or treble that of the cam-shaft. It is to be borne in mind also, that with an instrument operating at cam-shaft speed, provision must be made for two ignition discharges upon each revolution of the crankshaft, or four ignition discharges upon each revolution of the cam-shaft. From this it follows that the generating efficiency of the instrument must be high in order to attain a sufficient E. M. F. upon a limited angular movement of the generating elements. It will be appreciated also that the elimination of losses is a consideration of particular importance in an instrument designed to meet the requirements which the present invention has in view.

With these various circumstances in mind, I have devised a novel structure wherein a rotor, constituting one of the generating elements, preferably the inducing element or inductor, is symmetrically formed and arranged for rotation on a vertical axis, and supplied with laminations so as to provide a plurality of peripheral pole or air-gap surfaces. The other of the generating elements comprises a stator which is arranged as an armature for magnetic cooperation with the rotor element by means of lamination stacks which extend longitudinally of the rotor axis and have their ends deflected into magnetic association with the rotor laminations so as to meet them in parallel relationship. In order to keep within the necessary space limitations, while attaining the requisite flux area, I arrange each lamination stack with a plurality of air-gap surfaces disposed for cooperation simultaneously with rotor pole surfaces, said air-gap surfaces being spaced about the rotor axis at the requisite intervals for obtaining the desired magneto discharges.

The nature of the invention may be understood in more detail by reference to the illustrative embodiments shown in the accompanying drawings. Let it be understood that in these the reference character 10 designates a mounting quill of the standard form of those employed in typical timing and distributing instruments, so that it may be mounted in the usual bracket provided on the engine or generator casing for the mounting of such an instrument. Within this quill is rotatably mounted the sleeve 11 of the housing base 12, the quill and housing being secured together by a thrust washer 14 at the upper end of the quill and a snap ring 15 at its lower end. The housing base 12 closes the lower end of the housing 16, which preferably is formed of aluminum, and also carries the outer race 17 of the lower bearing 18. At the upper end of the housing 16 is secured the non-magnetic metal ring 19 which forms the bottom finish of the body member 20, and whereby the latter is retained in coaxial connection with the housing 16. The body member 20 is formed of bakelite or other suitable insulating material, and has an axial bore lined in part by the rotor bushing 21 which carries the inner race of the upper bearing 22. Within the body member 20 are molded the armature lamination stacks 24 and 24' which project vertically from the top of the body member. At the lower ends of the stacks the laminæ are extended inwardly in horizontal position, so that portions of their inner margins are exposed at the sides of the axial bore of the body member. The particular characteristics of these lamination stacks will be explained more in detail hereinafter.

The bearings 18 and 22 sustain the rotor. This rotor comprises a permanent magnet arranged on the axis of the device with its poles on opposite sides thereof. In the embodiments illustrated the positive poles are designated 25 and the negative poles 25'. In the embodiment illustrated in Figs. 1 and 2, the magnet has six poles. The like poles are connected by stacks of laminations, those for the positive poles being designated 26 and those for the negative poles 26'. The magnet, with its laminations, is mounted between a lower end piece 27 and an upper end piece 28, which preferably are of non-magnetic material, such as brass, and are secured in place by longitudinal screws 29 passing between the arms of the magnet. The lower end piece carries the inner race 36 of the lower bearing, and has driving connection with the driving spindle 23, the connection permitting sufficient play to accommodate any misalignment. The bearing spindle is equipped at its lower end with the coupling member 13 whereby a driving connection is effected with the generator shaft or the corresponding element from which the customary timing and distributing device is driven. The upper end piece 28 carries the outer race 31 of the upper bearing, and has an axial spindle 32 which extends through the bushing 21 into the breaker chamber 34.

Within the chamber 34 the spindle supports the breaker cam 35 which co-operates with the breaker lever 36 which is mounted in said chamber on its pivot 37 and carries the contact 38 arranged for co-operation with the stationary contact 39. The latter is mounted in a block 40, which is grounded through the lamination stack 24' to the frame. The breaker lever is restrained for co-operation with the breaker cam and the contact 39 by a spring 41. On top of the breaker cam is secured the distributer arm 44, which rotates with the rotor. It is a block of insulating material, such as bakelite, and carries the distributing point 45 which is connected by a conductor 46 with the axially disposed armature brush contact 47. Distributing conductors 48 are molded in the body member 20, and at their inner ends support the distributer electrodes 49, which are disposed about the rotor axis at the proper angular distances and arranged for co-operation with the distributer point 45. The outer ends of the conductors 48 are connected with piercing screws 50 adapted to make electrical connection with terminals of wires inserted in the terminal seats 51 and leading to the ignition plugs.

It will be observed that the laminations constituting stacks 24 and 24' are formed with vertical legs which project through the top of the body member 20, and with horizontal portions which extend inwardly in the body member and are exposed in horizontal disposal at the inner wall thereof for magnetic co-operation with the rotor laminations. The gap surfaces thus presented are distributed about the axis of the device in such relationship that the laminæ of each stack will be in magnetic co-operation with a plurality of like rotor poles simultaneously, the laminations of the respective stacks being associated with unlike poles simultaneously. In the form illustrated in Fig. 2, the air gap surfaces of the laminations 24 are designated $a$ and $a'$, and are disposed at an angular distance of 120°, while the air gap surfaces $b$ and $b'$ of the stack 24' are likewise arranged at 120°. Thus, with the rotor having six laminated air gap surfaces distributed at 60° intervals, it will be observed that the air gap surfaces of one stack will be in magnetic association with two rotor pole surfaces while the air gap surfaces of the other stack are in association with two rotor pole surfaces of opposite polarity, and that the polarity in the magnetic circuit is reversed upon rotation of the rotor through each 60°. By this distribution of the air gap surfaces therefore, the magnetic line cutting rate is doubled, and the reluctance in the armature is correspondingly reduced. At the same time the laminations in the stacks 24 and 24' are presented to those of the rotor in the relationship most effective for avoiding eddy currents and securing the desired flux and inductive effects in the armature.

The stacks 24 and 24' constitute, in effect, extensions of the laminated armature core 52, which is secured to their upper ends. As diagrammatically shown in Fig. 1 this core is encircled by the primary coil 54, one end of which is grounded as at $54^a$, and the other end $54^b$ is electrically connected with the breaker lever 36 through the instrumentality of the spring 41 and the imbedded conductor 55 in the body member 20. The condenser 56 is connected across the coil 54. The secondary coil 57 leads to the armature brush 58 which rides upon the contact 47 of the distributer arm. The upper portion of the instrument is housed by a cover 53 removably fitting the body member 20.

In operation, the rotor is actuated at camshaft speed, which is one-half engine speed. The movement of the permanently magnetic pole surfaces in magnetic association with the air gap surfaces of the armature lamination stacks induces in the armature core fluxes which alternate direction upon each 60° movement of the rotor. This induces an E. M. F. in the primary coil 54, and the resulting current is led through the conductor 55 to the breaker cam 36 and contacts 38 and 39, which are then in electrical connection. With the rotation of the rotor, the distributer point 45 is brought into co-operation with the successive electrodes 49 as the successive impulses in coil 54 reach their maximum. At those instants the breaker cam 35 operates the breaker lever 36 to separate the contacts 38 and 39, thus interrupting the current in the primary coil, with the result that a high tension impulse is induced in the secondary and discharged through the brush 58 and distributer conductor 46 to the electrode 49 with which the point 45 is then in co-operation, and through the associated conductor 48 and connection wire in seat 51 to the ignition plug. In the instrument illustrated in Figs. 1 to 4, inclusive, therefore, properly distributed ignition will be obtained for a six cylinder engine. The desired timing of the magneto discharge with the engine operation is obtained by rotary adjustment of the entire housing in the mounting quill 10. This varies the rotary position of the electrodes 49 with respect to the engine shaft, and alters the time of operation of the contact breaker, but obviously does not vary the relationship of the electrodes to the air gap surfaces of the armature lamination stacks. Hence, while variation of the timing of ignition to the engine is effected, the operation of the magneto and distributer remain the same, with the generating and discharging elements in the proper relationship to deliver maximum discharges.

In the embodiment just described, it will be observed that the number of impulses is established by the employment of six magnetic poles on the rotor for co-operation with four air gap areas on the armature stacks. In Figs. 5, 6 and 7 is illustrated a modified embodiment designed to simplify the construction of the rotor in an instrument for a six cylinder engine. In this embodiment the respective parts are designated by the same reference characters as are employed in Figs. 1 to 4 inclusive. It will be observed, however, that in this embodiment the rotor magnet is essentially a two pole magnet, each of its poles 25 and 25' being extended by lamination stacks 26 and 26' to provide two polar air gap areas displaced from each other by an angular distance of 120°. These laminated pole portions are designated $c$ on the positive pole and $d$ on the negative pole. Each of the lamination stacks 24 and 24' presents three air gap surfaces to the rotor, said surfaces being distributed at angular distances of 120°. In Fig. 6 the air gap surfaces for the stack 24 are designated $e$ and those of the stack 24' are designated $f$. By this arrangement, it will be observed, the magnetic circuit is completed through two negative and two positive pole surfaces and the direction of the flux in the armature core is reversed at each rotation of the rotor through 60°. By this arrangement the construction of the rotor is very materially simplified, as the permanent magnet is reduced to a simple two-pole arrangement which readily may be made out of good magnetic steels, such as cobalt steel, which do not lend themselves readily to elaborate working. In this embodiment it will be observed that the horizontal arms of the armature lamination stacks are carried through the body member 20 at different levels, as necessitated by the overlapping of their end portions. Where exposed at the sides of the rotor chamber, however, they are extended vertically by means of suitable shoes or projections 60, for co-operation with the rotor pole laminations. In other words, the stator pole surfaces $e$ of one polarity and the stator pole surfaces $f$ of the other polarity are circumferentially arranged side by side to cooperate with the positive and negative pole surfaces $c$ and $d$ of the rotor. The connections between the laminations $e$ and $f$ which constitute the stator pole surfaces with the vertical laminations stacks 24 and 24' overlap each other as indicated by the dotted circular lines in Fig. 6, said connections being disposed at different levels so as to prevent short-circuiting of the flux induced by the rotor.

In Fig. 8 is illustrated an arrangement of rotor and armature laminations in an instrument for a four cylinder engine. Here the rotor magnet has the two poles 25 and 25', and the armature stacks 24 and 24' have the lower ends of the laminations extended horizontally through the body member 20 to afford air gap surfaces at angular distances of 180°, those of the stack 24 being designated $g$ and those of the stack 24' being designated $h$. Each pole of the rotor magnet carries laminations which present a single area for co-operation with the air gap surfaces of the armature laminations. These areas of the rotor laminations are arranged at 90° relationship, so that the lamination stack of one rotor pole is in co-operation with an air gap surface of one of the armature stacks while that of the other pole is in co-operation with an air gap surface of the other armature stack.

In this fashion the flux in the armature core is alternated in polarity at every 90° movement of the rotor and, due to the fact that the rotor is driven at cam-shaft speed, the magneto discharge is synchronized with the engine operation so that there will be two magneto discharges for each revolution of the crank-shaft.

Although the foregoing constitute illustrative embodiments of the features of the invention, various arrangements for modification of the same will suggest themselves to one skilled in the art for the inclusion of features ordinarily employed in magnetos, such as a safety spark arrangement, short circuiting switch, etc.

By employment of the novel features which characterize this invention, I am able to construct within a limited area a magneto which will give efficient performance at camshaft speed, thus providing a device which may be installed in the location of the timing and distributing device customarily employed in connection with battery and coil systems. Advantageous symmetry and balance are attained, terminal connections are desirably accessible, and the requisite facilities for inspection are afforded. The construction makes for the elimination of losses in the generating elements and at contacts and affords an assembly which will withstand prolonged and trying use.

I claim:

1. In an ignition device, the combination of a rotor comprising a permanent magnet mounted for rotation on a vertical axis, and presenting a plurality each of positive and negative pole pieces, and an armature provided with lamination stacks having horizontally extending laminations disposed for magnetic co-operation with a plurality of like rotor poles simultaneously.

2. In an ignition device, the combination of a rotor comprising a permanent magnet mounted for rotation on a vertical axis, horizontally extending laminations carried thereby and presenting peripheral air gap surface portions, of which a plurality are negatively polarized and a plurality positively polarized, lamination stacks presenting a plurality of air gap surfaces for magnetic co-operation simultaneously with a plurality of negative and a plurality of positive air gap surfaces of the rotor, and an armature core connected with the lamination stacks.

3. In an ignition device, a rotor presenting a plurality each of negatively polarized and positively polarized peripheral portions spaced apart circumferentially, a pair of lamination stacks each presenting a plurality of air gap surfaces for magnetic co-operation simultaneously with a plurality of peripheral rotor portions of like polarity, and an armature core connecting the lamination stacks.

4. In magneto construction, the combination of a rotor including a permanent magnet presenting a plurality of peripheral magnetic induction areas of both negative and positive polarity, a stator member including a magnetic core having members extending longitudinally of the rotor axis, each of said members presenting a plurality of magnetic induction areas for magnetic co-operation with the rotor, induction areas of one of said members being disposed for co-operation simultaneously with a plurality of rotor induction areas of one polarity, and the induction areas of the other member being disposed for co-operation simultaneously with a plurality of rotor induction areas of the opposite polarity.

5. In a magneto, the combination of a rotor including a permanent magnet arranged for rotation on its axis, laminations carried thereby and presenting a plurality each of positive and negative peripheral magnetic induction areas angularly separated about the axis, a stator element including magnetic conductors extending longitudinally of the rotor axis, each of said conductors presenting a plurality of induction areas spaced about the rotor axis and arranged for magnetic co-operation with the rotor induction areas.

6. In magneto construction, the combination of a rotor comprising a permanent magnet arranged for rotation on its axis and presenting peripheral magnetic induction areas of different polarity, an armature including lamination stacks extending longitudinally of the rotor axis and each presenting a plurality of induction areas spaced apart about the rotor axis and arranged for magnetic co-operation with the rotor induction areas, an induction coil subject to flux in the armature, and means carried by the rotor for controlling discharge from the coil.

7. In magneto construction, the combination with a rotor, of a stator including a core and laminated core legs extending from the core longitudinally of the rotor axis, said core legs having terminal portions extending at an angle to said axis and each presenting a plurality of induction areas spaced about the rotor axis for magnetic co-operation with the rotor.

8. In magneto construction, the combination of a rotor element and a stator element, each presenting a plurality of induction areas, the magnetic induction areas on the rotor element being arranged for magnetic association with those of the stator element, alternate induction areas on one of the elements being magnetically connected and adjacent induction areas on the other element being magnetically connected.

9. In magneto construction, the combination with a rotor mounted for rotation on a vertical axis and having peripheral magnetic induction areas distributed at angular intervals about its axis, of a stator comprising elements extending longitudinally of the rotor axis and disposed at opposite sides thereof and lateral extensions on said elements providing a plurality of magnetic induction areas on each spaced apart by an angular distance exceeding the spacing of the rotor induction areas and being disposed for magnetic co-operation with the latter.

10. In a magneto device, an inductor having a plurality of polarized pole surfaces of one polarity and a plurality of polarized pole surfaces of another polarity, an armature having a plurality of pole members of one polarity and a plurality of pole members of opposite polarity simultaneously cooperating with the pole surfaces of said inductor, said inductor and armature being relatively rotatable.

11. In a magneto device, an armature and a relatively rotatable inductor, said armature having a plurality of pole members of one polarity and a plurality of pole members of opposite polarity, a common core interconnecting the pole members of one polarity with the pole members of the other polarity, an ignition coil means on said core, said inductor having two sets of oppositely polarized pole surfaces for simultaneously directing parallel magnetic fluxes between two armature pole members of one polarity and two armature pole members of opposite polarity, said armature and inductor poles being so arranged that a relative rotation of less than 180° produces a complete flux reversal in said core.

12. In a magneto device, an inductor and an armature rotatable relative to each other, said inductor comprising a permanent magnet having a plurality of positive and a plurality of negative poles, said armature comprising a plurality of pole members of one polarity, a plurality of pole members of the opposite polarity, a common core member interconnecting the pole members of one polarity with the pole members of opposite polarity, and ignition coil means interlinked with said core member, the poles of said inductor being so arranged relative to the poles of said armature as to simultaneously direct a plurality of parallel fluxes through the pole members thereof, to produce a complete flux reversal through said core upon relative rotation of the inductor through a fraction of one-half of a revolution.

13. In a magneto device, a stationary armature, a rotary inductor cooperating with said armature, said inductor having a plurality of circumferentially arranged pole surfaces of one polarity, a plurality of similarly arranged pole surfaces of opposite polarity disposed side by side within the intervening space between said first-mentioned pole surfaces, said armature comprising a core member, ignition coil means associated with said core member and a set of pole members extending from one core end for simultaneously cooperating with inductor pole surfaces of one polarity and a set of pole members extending from the other end of said core for simultaneously cooperating with a plurality of inductor pole surfaces of opposite polarity.

14. In magneto apparatus of the character described, complementary U-shape oppositely-directed magnetic members disposed with their respective end portions adjacent and in spaced relation with respect to each other to provide cooperable magnetic pole pieces, said members being supported for relative rotation with respect to each other about a given axis and each being substantially symmetrical with respect to such axis.

In testimony whereof I have hereunto signed my name.

E. DE W. PERRY.